(12) United States Patent
Nozawa et al.

(10) Patent No.: US 8,378,983 B2
(45) Date of Patent: Feb. 19, 2013

(54) TOUCH PANEL AND TOUCH PANEL TYPE DISPLAY APPARATUS

(75) Inventors: Junichi Nozawa, Kirishima (JP); Yuji Kojima, Higashiomi (JP)

(73) Assignee: Kyocera Corporation, Kyoto (JP)

( * ) Notice: Subject to any disclaimer, the term of this patent is extended or adjusted under 35 U.S.C. 154(b) by 304 days.

(21) Appl. No.: 12/668,865

(22) PCT Filed: Aug. 29, 2008

(86) PCT No.: PCT/JP2008/065517
§ 371 (c)(1),
(2), (4) Date: Jan. 12, 2010

(87) PCT Pub. No.: WO2009/028653
PCT Pub. Date: Mar. 5, 2009

(65) Prior Publication Data
US 2010/0201640 A1   Aug. 12, 2010

(30) Foreign Application Priority Data

Aug. 30, 2007 (JP) ................................ 2007-224170
Sep. 27, 2007 (JP) ................................ 2007-250326
Sep. 27, 2007 (JP) ................................ 2007-250328
Jan. 30, 2008 (JP) ................................ 2008-018678

(51) Int. Cl.
*G06F 3/041* (2006.01)
(52) U.S. Cl. .................................... 345/173; 345/156
(58) Field of Classification Search ................. 345/156, 345/173
See application file for complete search history.

(56) References Cited

U.S. PATENT DOCUMENTS

| | | | |
|---|---|---|---|
| 6,529,188 B1 | 3/2003 | Suzuki | 345/173 |
| 6,721,019 B2 | 4/2004 | Kono et al. | |
| 6,847,355 B1 * | 1/2005 | Nishikawa et al. | 345/173 |
| 2001/0011727 A1 * | 8/2001 | Yamazaki et al. | 257/59 |
| 2001/0043291 A1 * | 11/2001 | Kono et al. | 349/12 |
| 2003/0043122 A1 | 3/2003 | Suzuki | 345/173 |
| 2004/0169624 A1 * | 9/2004 | Yamazaki et al. | 345/76 |

(Continued)

FOREIGN PATENT DOCUMENTS

| | | |
|---|---|---|
| EP | 1424625 A1 | 6/2004 |
| EP | 2251771 A1 | 11/2010 |

(Continued)

OTHER PUBLICATIONS

Extended European search report dated Nov. 10, 2011 for corresponding European application 08828271.0 cites the U.S. patent application publications and foreign documents above.

*Primary Examiner* — Viet Pham
(74) *Attorney, Agent, or Firm* — DLA Piper (US) LLP

(57) ABSTRACT

A touch panel X in accordance with the present invention includes a first base body 10 including a first resistive film 12, a second base body 20 including a second resistive film 22 and a wiring electrodes 23 and 24, and a conductive adhesive member 30 configured to electrically connect the first base body 10 and the wiring electrodes 23 and 24, and bond the first base body 10 and the second base body 20 so that the first resistive film 12 and the second resistive film 22 face each other. The conductive adhesive member 30 defines an internal space S1 and an opening portion M. The wiring electrodes 23 and 24 include connection portions 23*a* and 24*a*. The connection portions 23*a* and 24*a* are formed in an area corresponding to the opening portion M.

14 Claims, 6 Drawing Sheets

U.S. PATENT DOCUMENTS

| | | |
|---|---|---|
| 2004/0239641 A1 | 12/2004 | Takahata et al. |
| 2005/0179373 A1* | 8/2005 | Kobayashi .................... 313/506 |
| 2006/0038176 A1* | 2/2006 | Akimoto et al. ................ 257/59 |
| 2006/0223346 A1 | 10/2006 | Fujii et al. |
| 2011/0012865 A1 | 1/2011 | Nozawa |

FOREIGN PATENT DOCUMENTS

| | | |
|---|---|---|
| JP | 3018780 | 11/1995 |
| JP | 09-081302 | 3/1997 |
| JP | 11-219259 | 8/1999 |
| JP | 2001-249766 | 9/2001 |
| JP | 2001-296970 | 10/2001 |
| JP | 2003-196030 | 7/2003 |
| JP | 2003-216339 | 7/2003 |
| TW | I284228 B | 7/2007 |

* cited by examiner

TOUCH PANEL AND TOUCH PANEL TYPE DISPLAY APPARATUS

CROSS-REFERENCE TO THE RELATED APPLICATIONS

This application is a national stage of international application No. PCT/JP2008/065517, filed on Aug. 29, 2008, and claims the benefit of priority under 35 USC 119 to Japanese Patent Application No. 2007-224170, filed on Aug. 30, 2007, Japanese Patent Application No. 2007-250326, filed on Sep. 27, 2007, Japanese Patent Application No. 2007-250328, filed on Sep. 27, 2007 and Japanese Patent Application No. 2008-018678, filed on Jan. 30, 2008, the entire contents of all of which are incorporated herein by reference.

TECHNICAL FIELD

The present invention relates to a touch panel disposed on a display screen such as a liquid crystal display. The present invention further relates to a touch panel type display apparatus including a touch panel disposed on a display apparatus.

BACKGROUND ART

Touch panel type display apparatuses include, for example, an apparatus including a touch panel for detecting an input position by a resistance change caused by a pressing operation, which is disposed on a liquid crystal display (for example, refer to Japanese Patent Application Laid-open No. 2003-196030 and Japanese Patent Application Laid-open No. 2003-216339).

The touch panel has a configuration in which an input panel is disposed to face a base panel. The base panel includes, on a surface facing the input panel, a transparent insulating base member made of a soda glass plate, a transparent electrode made of ITO formed in the center of the surface facing the input panel, a routed wiring which is connected to sides of the transparent electrode facing each other and disposed in an insulating portion outside the transparent electrode, and a connection electrode disposed in the insulating portion outside the transparent electrode. The input panel includes, on a surface facing the base panel, a transparent insulating base member made of a micro glass plate, a transparent electrode made of ITO formed in the center of the surface facing the base panel, and a routed wiring which is connected to sides of the transparent electrode facing each other and disposed in an insulating portion outside the transparent electrode. In a touch panel having such a configuration, when pressing a predetermined position on the touch panel, the input panel bends, and the transparent electrode of the input panel and the transparent electrode of the base panel contact each other at the pressed position. The contact position is detected by measuring an electrical resistance of the transparent electrode, and is read as input information.

In the touch panel, the input panel and the base panel are disposed to face each other via a seal material. In a touch panel disclosed in Japanese Patent Application Laid-open No. 2003-196030, the connection electrode of the base panel and the routed wiring of the input panel are electrically connected by an electrically-conductive adhesive inside the seal material. In such a configuration, the electrically connecting portion needs to be provided inside the seal material, and hence the touch panel cannot be sufficiently downsized. In contrast, in a touch panel disclosed in Japanese Patent Application Laid-open No. 2003-216339, an anisotropically conductive adhesive is used as a seal material. Therefore, the electrically connecting portion inside the seal material is not necessary, so that the touch panel can be downsized.

However, in the touch panel disclosed in Japanese Patent Application Laid-open No. 2003-216339, in order to prevent unnecessary electrical connection from occurring in a portion other than the portion where the connection electrode of the base panel and the routed wiring of the input panel should be electrically connected, the routed wiring may be required to be routed outside of the seal material, in such a case, there is a problem that the touch panel cannot be sufficiently downsized.

DISCLOSURE OF INVENTION

The present invention is directed at providing a touch panel and a touch panel type display apparatus which are easily downsized.

A touch panel according to one embodiment of the present invention is related to a touch panel comprising: a first base body including a first resistive film; a second base body including a second resistive film and a wiring electrode; and a conductive adhesive member configured to electrically connect the first resistive film and the wiring electrode. In the touch panel, the first base body and the second base body is bonded by the conductive adhesive member so that the first resistive film and the second resistive film face each other. The conductive adhesive member along with the first base body and the second base body defines an internal space and an opening portion which connects the internal space and an external space. The wiring electrode includes a connection portion connecting a portion of the wiring electrode located in the internal space and a portion of the wiring electrode located in the external space. The connection portion is formed at a position corresponding to the opening portion.

In the touch panel, the first base body and the second base body are bonded together by the conductive adhesive member which electrically connects the first resistive film of the first base body and the wiring electrode of the second base body. Therefore, in the touch panel, an area where the first resistive film of the first base body and the wiring electrode of the second base body are electrically connected need not be separately secured inside the conductive adhesive member (in a side of the internal space), so that downsizing can be accomplished.

Since the touch panel type display apparatus according to one embodiment of the present invention includes the touch panel, the touch panel type display apparatus can obtain the same advantage as that of the touch panel. In other words, the touch panel type display apparatus is suitable for downsizing.

EXPLANATIONS OF LETTERS OR NUMERALS

Figure 1:
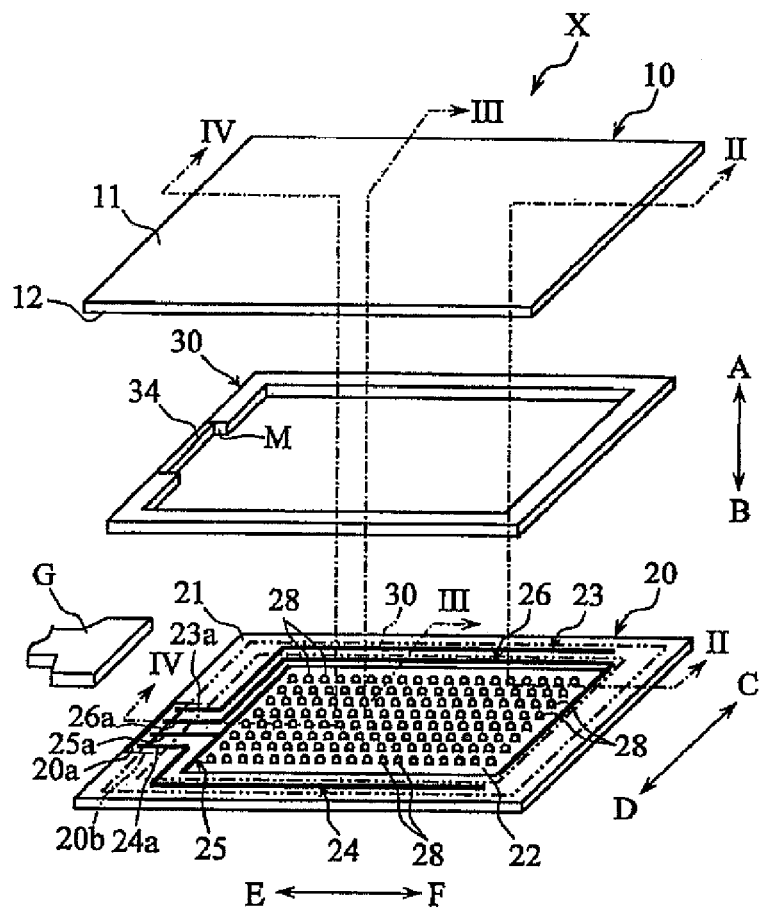
FIG. 1 is an exploded perspective view representing a schematic configuration of a touch panel according to an embodiment of the present invention.
Figure 2:
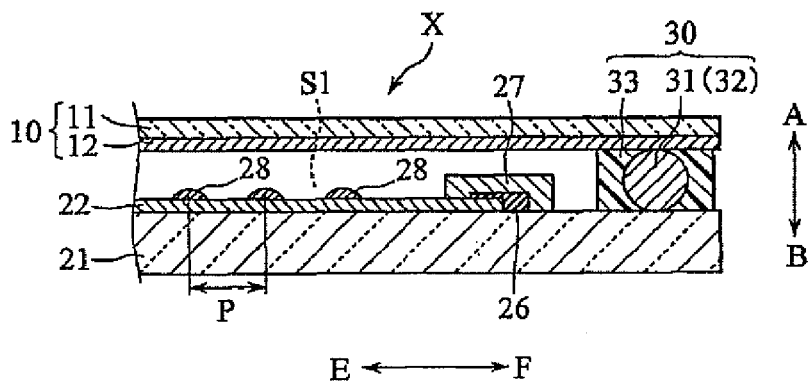
FIG. 2 is a cross-sectional view taken along line II-II of FIG. 1 in an assembled state of the touch panel.
Figure 3:
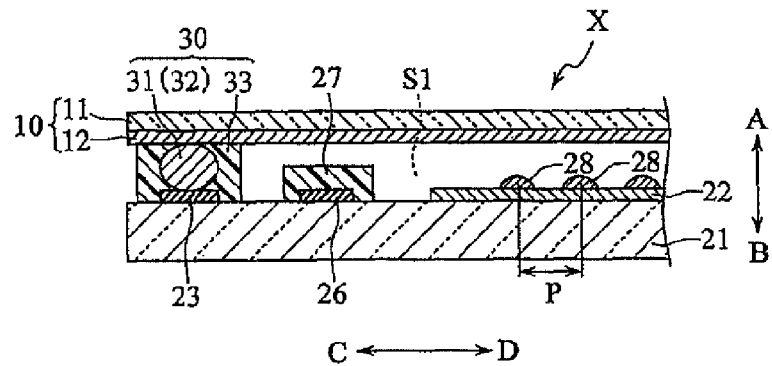
FIG. 3 is a cross-sectional view taken along line III-III of FIG. 1 in an assembled state of the touch panel.

X Touch panel
Y Touch panel type display apparatus
10 First base body
12 First resistive film
20 Second base body
20a External conductive area
22 Second resistive film
23, 24 Wiring electrode
23a, 24a Connection portion (of wiring electrode 23, 24)
25, 26 Wiring electrode
25a, 26a Connection portion (of wiring electrode 25, 26)
27 Insulating layer
28, 29a, 29b Dot spacer
30 Conductive adhesive member
34 Sealing member
40 Liquid crystal display panel
S1 Internal space
S2 External space
G Conductive member
M Opening portion

BEST MODE FOR CARRYING OUT THE INVENTION

Hereinafter, a touch panel and a touch panel type display apparatus according to an embodiment of the present invention will be described with reference to the drawings.

First, a touch panel X and a touch panel type display apparatus Y according to the present embodiment will be described with reference to FIGS. 1 to 9.

As illustrated in FIGS. 1 to 4, the touch panel X includes a first base body 10, a second base body 20, and a conductive adhesive member 30.

The first base body 10 has flexibility as a whole, and has a generally rectangular shape in a plan view. The plan view shape of the first base body 10 is not limited to a generally rectangular shape, but may be any other shape. The first base body 10 includes an insulating substrate 11 and a first resistive film 12.

The insulating substrate 11 is a member having a role for supporting the first resistive film 12, and has a translucency and electrical insulating properties in a direction crossing the main surface of the insulating substrate 11 (for example, AB direction). As used herein, "translucency" means permeability to visible light. Examples of a constituent material of the insulating substrate 11 include glass, translucent plastic, and the like, and above all, the glass is preferred from the viewpoint of heat-resisting properties. When employing the glass as the constituent material of the insulating substrate 11, the thickness of the insulating substrate 11 is preferably set between 0.1 mm and 0.3 mm so that sufficient shape stability and flexibility are secured.

The first resistive film 12 contributes to detect a voltage at a contact point where the first resistive film 12 contacts a second resistive film 22 of the second base body 20 described below, and has a translucency in a direction crossing the main surface of the first resistive film 12 (for example, AB direction). The first resistive film 12 of the present embodiment is formed by a conductive material having a predetermined electrical resistance so that the first resistive film 12 spreads on an approximately entire surface of the main surface of the insulating substrate 11 facing the B direction. The resistance value of the first resistive film 12 is, for example, 200 Ω/□ or more and 1500 Ω/□ or less. In the present embodiment, the height of the first resistive film 12 is set to $2.0 \times 10^{-2}$ μm or less to obtain a high resistance. Examples of a constituent material of the first resistive film 12 include a translucent conductive member such as ITO (Indium Tin Oxide), ATO (Antimony trioxide), tin oxide, and zinc oxide.

The second base body 20 has a generally rectangular shape in a plan view, and is disposed to face the first base body 10. The plan view shape of the second base body 20 is not limited to a generally rectangular shape, but may have any other shape. The second base body 20 includes an insulating substrate 21, the second resistive film 22, wiring electrodes 23 and 24, wiring electrodes 25 and 26, an insulating layer 27, and a dot spacer 28. The second base body 20 includes an external conductive area 20a where the second base body 20 is connected to a conductive member G (for example, FPC (Flexible Printed Circuit)).

The insulating substrate 21 has a role for supporting the second resistive film 22, the wiring electrodes 23 and 24, the wiring electrodes 25 and 26, the insulating layer 27, and the dot spacer 28, and has a translucency and electrical insulating properties in a direction crossing the main surface of the insulating substrate 21 (for example, AB direction). Examples of a constituent material of the insulating substrate 21 include glass, translucent plastic, and the like, and above all, the glass is preferred from the viewpoint of heat-resisting properties. When employing the glass as the constituent material of the insulating substrate 21, the thickness of the insulating substrate 21 is preferably set to 0.7 mm or more so that a sufficient shape stability is secured.

The second resistive film 22 contributes to detect a voltage at a contact point where the second resistive film 22 contacts the first resistive film 12 of the first base body 10, and has a translucency in a direction crossing the main surface of the second resistive film 22 (for example, AB direction). The second resistive film 22 is formed in an area of the main surface of the insulating substrate 21 facing the A direction excluding an outer edge portions of the main surface (in an area where the first resistive film 12 is formed in a plan view)

by a conductive material having a predetermined electrical resistance. The translucency and electrical resistance value required for the second resistive film 22 are the same as those required for the first resistive film 12. Examples of a constituent material of the second resistive film 22 include similar materials to those used for the first resistive film 12.

The wiring electrodes 23 and 24 have a role for applying a voltage to the first resistive film 12 through the conductive adhesive member 30 described below, and are formed around the second resistive film 22. One end portion of the wiring electrode 23 is located at one edge portion in a side indicated by the arrow C of an adhesive area (area enclosed by two-dot chain lines in FIG. 1) of the conductive adhesive member 30 described below in the insulating substrate 21, and the other end portion is located at the external conductive area 20a of the second base body 20. One end portion of the wiring electrode 24 is located at one edge portion in a side indicated by the arrow D of the adhesive area of the conductive adhesive member 30, and the other end portion is located at the external conductive area 20a of the second base body 20.

The resistance values between both end portions of the wiring electrodes 23 and 24 are preferably set smaller than or equal to 0.01 times the resistance value between both end portions of the first resistive film 12 from the viewpoint of detection accuracy of the touch panel X. The wiring electrodes 23 and 24 of the present embodiment are formed by, for example, a metal thin film (line width: 0.5 mm or more and 2 mm or less, thickness: 0.5 μm or more and 2 μm or less) from the viewpoint of hardness and shape stability. As the metal thin film, an aluminum film, an aluminum alloy film, a laminated film of a chromium film and an aluminum film, a laminated film of a chromium film and an aluminum alloy film, and the like may be used. When the first resistive film 12 is formed by ITO, the metal thin film is preferred to be the laminated film of a chromium film and an aluminum film (chromium is disposed between ITO and aluminum) or the laminated film of a chromium film and an aluminum alloy film (chromium is disposed between ITO and aluminum alloy) from the view point of adhesiveness between the metal thin film and ITO. As a forming method of the metal thin film, for example, a sputtering method, an evaporation method, a chemical vapor deposition (CVD) method may be used.

The wiring electrodes 25 and 26 have a role for applying a voltage to the second resistive film 22. One end portion of the wiring electrode 25 is connected to one edge portion in a side indicated by the arrow E of the second resistive film 22, and the other end portion is located at the external conductive area 20a of the second base body 20. One end portion of the wiring electrode 26 is connected to one edge portion in a side indicated by the arrow F of second resistive film 22, and the other end portion is located at the external conductive area 20a of the second base body 20.

The resistance values between both end portions of the wiring electrodes 25 and 26 are preferably set smaller than or equal to 0.01 times the resistance value between both end portions of the second resistive film 22 from the viewpoint of detection accuracy of the touch panel X. The wiring electrodes 25 and 26 are formed by a metal thin film (line width: 0.5 mm or more and 2 mm or less, thickness: 0.5 μm or more and 2 μm or less) in the same way as the wiring electrodes 23 and 24. As the metal thin film, the same metal thin films as those constituting the wiring electrodes 23, 24 may be used.

When the wiring electrodes 23 to 26 are formed by a metal thin film, the height of surface unevenness caused by the wiring electrodes 23 to 26 can be sufficiently smaller than the height of the dot spacer 28. Therefore, in the touch panel X, it is possible to sufficiently suppress an occurrence of unnecessary contact between the wiring electrodes 23 to 26 and the first resistive film 12 caused by a small difference between the height of surface unevenness caused by the wiring electrodes 23 to 26 and the height of the dot spacer 28.

When the metal thin film is formed by an aluminum film, an aluminum alloy film, a laminated film of a chromium film and an aluminum film, or a laminated film of a chromium film and an aluminum alloy film, ease of thin film forming and ease of thin film processing (patterning or the like) can be improved, and further the wiring resistance can be relatively low.

The insulating layer 27 is a layer for preventing the wiring electrodes 23 and 24 or the wiring electrodes 25 and 26 and the first resistive film 12 from contacting each other in a predetermined area excluding one end portions (adhesive area of the conductive adhesive member 30) and the other end portions (area located at the external conductive area 20a of the second base body 20) of the wiring electrodes 23 and 24, and a predetermined area excluding the other end portions of the wiring electrodes 25 and 26 (area located at the external conductive area 20a of the second base body 20), and is formed so that the insulating layer 27 covers these predetermined areas. Examples of a constituent materials of the insulating layer 27 include similar materials to those used for the dot spacer 28 described below, and specifically, a thermosetting resin such as a polyester resin, an ultraviolet curable resin such as an acrylic resin, or the like may be used. Especially, the thermosetting resin is preferred from the viewpoint of operational efficiency of the manufacturing process. The thickness of the insulating layer 27 is preferred to be 10 μm or less from the viewpoint of flatness of the touch panel X. In FIG. 1, the insulating layer 27 is omitted for ease of viewing the figure.

When causing the first resistive film 12 and the second resistive film 22 to contact each other at a predetermined position (when inputting information), the dot spacer 28 has a role for suppressing an unnecessary contact between the first resistive film 12 and the second resistive film 22 in an area other than the predetermined position. In the present embodiment, the dot spacers 28 are disposed in a matrix form in which the dot spacers 28 are aligned at approximately regular intervals in the CD direction and the EF direction on the insulating substrate 21.

Preferably, the dot spacer 28 is difficult to see while performing a function for preventing unnecessary contact between the first resistive film 12 and the second resistive film 22, and for example, the dot spacer 28 has a hemispherical shape with a diameter of 40 μm or less and a height of 1.0 μm or more and 3.5 μm or less. The distance (arrangement pitch) P between adjacent dot spacers 28 in the CD direction or the EF direction is, for example, 2 mm or more and 4 mm or less.

The dot spacer 28 is not necessarily formed on the insulating substrate 21 (second base body 20), but may be formed on the insulating substrate 11 (first base body 10). The dot spacers 28 are not necessarily aligned in a matrix form (line-column form) at approximately regular intervals.

Such a dot spacer 28 can be formed by screen-printing, offset printing, or photo lithography method using the same materials (for example, thermosetting resin or ultraviolet curable resin) as those of the insulating layer 27. When employing a thermosetting resin as a constituent material of the dot spacer 28, it is possible to improve environmental resistance such as heat resistance and chemical resistance, so that it is possible to secure, for example, high long-term reliability. As the thermosetting resin, for example, an epoxy resin, an unsaturated polyester resin, a urea resin, a melamine resin, a phenolic resin can be used. In contrast, when employing an ultraviolet curable resin as a constituent material of the dot spacer 28, it is possible to shorten a curing time compared with the thermosetting resin, so that manufacturing efficiency of the dot spacer 28 can be further improved. As the ultraviolet curable resin, for example, an acrylic resin and an epoxy resin may be used.

Figure 6A:
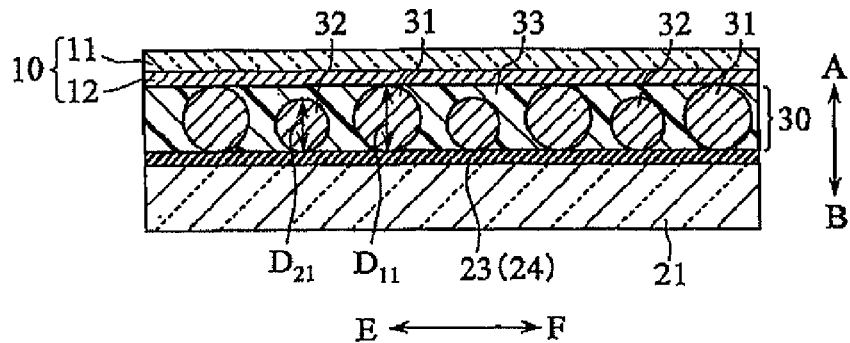
FIG. 6A and FIG. 6B are cross-sectional views for explaining a series of processes for bonding a first base body and a second base body of the touch panel illustrated in FIG. 1.
Figure 6B:
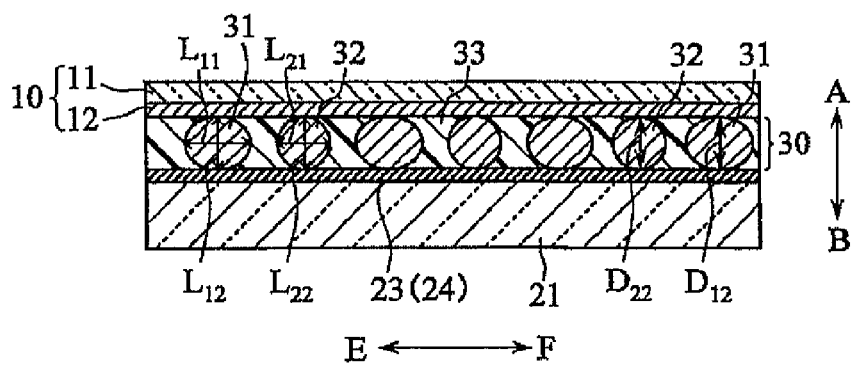

As illustrated in FIGS. 6A and 6B, the conductive adhesive member 30 has a role to electrically connect the first resistive film 12 and the wiring electrodes 23 and 24 and bond the first base body 10 and the second base body 20. When the conductive adhesive member 30 bonds the first base body 10 and the second base body 20 together, the conductive adhesive member 30 along with the first base body 10 and the second base body 20 defines an internal space S1 and an opening portion M. The internal space S1 in the present embodiment has a predetermined internal pressure (for example, pressure larger than atmospheric pressure) by filling with air or the like so that the distance between the first base body 10 and the second base body 20 is maintained. The opening portion M in the present embodiment is formed in an area adjacent to the external conductive area 20a from the viewpoint of reducing the length of the wiring electrodes 23 to 26.

Figure 4:
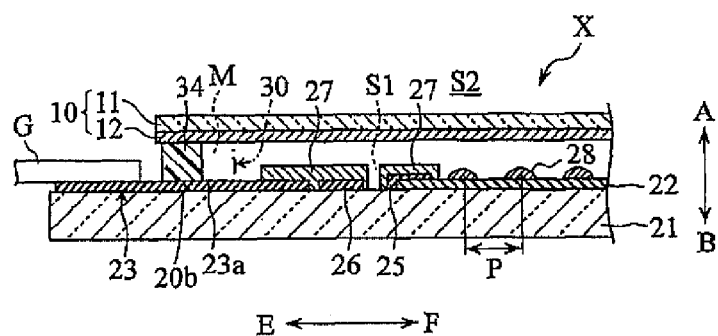
FIG. 4 is a cross-sectional view taken along line IV-IV of FIG. 1 in an assembled state of the touch panel.
Figure 5:
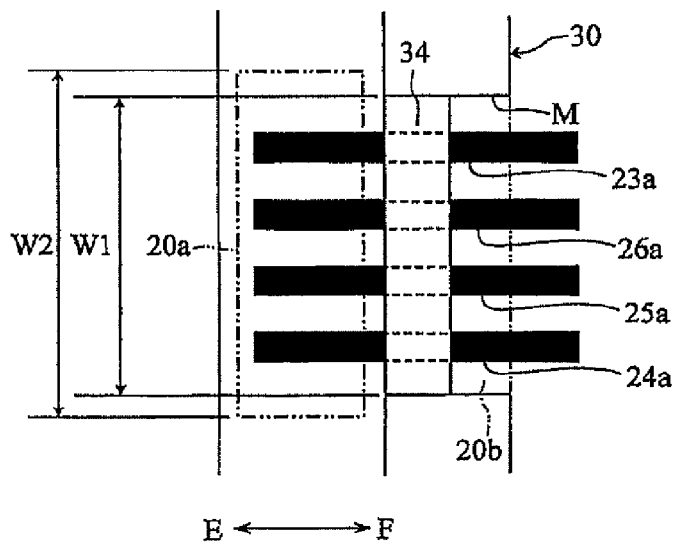
FIG. 5 is an enlarged plan view of an important portion of the touch panel illustrated in FIG. 1.

As illustrated in FIGS. 1, 4, and 5, the conductive adhesive member 30 in the present embodiment is formed into a rectangular frame shape as a whole although a part thereof is cut off. The conductive adhesive member 30 in the present embodiment is disposed within an area where the first resistive film 12 is formed and surrounds an area where the second resistive film 22 is formed in a plan view (seeing in the AB direction). The cut-off portion of the conductive adhesive member 30 corresponds to the opening portion M. In the examples illustrated in the figures, the conductive adhesive member 30 is disposed to surround the second resistive film 22 from the viewpoint of a sealing performance between the first resistive film 12 and the second resistive film 22. However, the configuration of the conductive adhesive member 30 is not limited to the above.

The opening portion M is a portion for connecting the internal space S1 and an external space S2, and used to inject air into the internal space S1. In an area corresponding to the opening portion M, there are connection portions 23a and 24a for connecting portions of the wiring electrodes 23 and 24 located in the external space S2 and portions of the wiring electrodes 23 and 24 located in the internal space S1, and connection portions 25a and 26a for connecting portions of the wiring electrodes 25 and 26 located in the external space S2 and portions of the wiring electrodes 25 and 26 located in the internal space S1. The connection portions 23a to 26a in the present embodiment extend along the depth direction (arrow F direction) of the opening portion M. Therefore, in the touch panel X, when injecting a fluid such as air into the internal space S1 through the opening portion M to secure a predetermined distance between the first base body 10 and the second base body 20, the wiring electrodes 23 to 26 function as a guide of the fluid. Therefore, in the touch panel X, a fluid can be injected more smoothly, so that the manufacturing efficiency can be further improved.

The conductive adhesive member 30 in the present embodiment is formed like a rectangular frame which includes a first particle 31, a second particle 32, and an adhesive material 33.

The first particle 31 has a role for electrically connecting the first resistive film 12 and the wiring electrodes 23 and 24, and at least a part of the first particle 31 is embedded in the conductive adhesive member 30. The first particle 31 has a generally spherical shape from the viewpoint of reducing the damage on the first resistive film 12 and the wiring electrodes 23 and 24 which contact the first particle 31. However, the shape of the first particle 31 is not limited to a generally spherical shape, but the first particle 31 may have, for example, a polyhedral shape. The first particle 31 only has to have electrical conductivity on the surface thereof, and for example, a spherical insulating body such as a plastic ball on the surface of which a conductive material (for example, gold or nickel) is coated is employed.

Regarding the first particle 31 in the present embodiment, the diameter $D_{11}$ (refer to FIG. 6A) of the first particle 31 in the AB direction before deformation (compression) is larger than the diameter $D_{21}$ (refer to FIG. 6A) of the second particle 32 in the AB direction before deformation (compression), so that the first particle 31 is more compressed than the second particle 32. The diameter $D_{11}$ (refer to FIG. 6A) of the first particle 31 before compression is, for example, 2 μm or more and 25 μm or less, and the diameter $D_{12}$ (refer to FIG. 6B) of the first particle 31 after compression is, for example, 1.5 μm or more and 24 μm or less. The diameter $D_{11}$ of the first particle 31 before compression is not limited to the range described above, but may be in a range in which a sufficient contact area with the first resistive film 12 and the wiring electrodes 23 and 24 is secured and the first particle 31 is not excessively deformed.

As described above, the first particle 31 is more compressed than the second particle 32. In other words, the deformation rate (compression rate) $D_1$ of the first particle 31 defined in the formula 1 below and the aspect ratio $L_1$ of the first particle 31 defined in the formula 2 below are larger than the deformation rate (compression rate) $D_2$ of the second particle 32 (refer to formula 3) and the aspect ratio $L_2$ of the second particle 32 (refer to formula 4). The deformation rate (compression rate) $D_1$ of the first particle 31 is, for example, 0.03 or more and 0.3 or less, and the aspect ratio $L_1$ of the first particle 31 is, for example, 1.03 or more and 3 or less.

$$D_1 = (D_{11} - D_{12})/D_{11} \quad \text{[Formula 1]}$$

$D_1$: deformation rate (compression rate) of the first particle
$D_{11}$: diameter of the first particle in the AB direction before compression
$D_{12}$: diameter of the first particle in the AB direction after compression $$L_1 = L_{11}/L_{12} \quad \text{[Formula 2]}$$

$L_{11}$ = length in the long axis direction (length in the EF direction in FIG. 6B)
$L_{12}$ = length in the short axis direction (length in the AB direction in FIG. 6B)

The first particle 31 is configured to directly contact the first resistive film 12, but is not limited to such a configuration, and it is possible to form, for example, the same wiring as that of the wiring electrodes 23 and 24 on the insulating substrate 11, and electrically connect the first particle 31 and the first resistive film 12 through the wiring.

The second particle 32 is for defining the distance between the first base body 10 and the second base body 20, and at least a part of the second particle 32 is embedded in the conductive adhesive member 30. The second particle 32 has a generally spherical shape because of the same reason as that of the first particle 31. However, the shape of the second particle 32 is not limited to a generally spherical shape, but the second particle 32 may have, for example, a polyhedral shape. As the second particle 32, a silica sphere (spherical particle mainly made of silicon dioxide) is employed from the viewpoint of ease of definition of the distance between the first base body 10 and the second base body 20. However, other materials such as glass fiber may be employed as the second particle 32.

Regarding the second particle 32 in the present embodiment, the diameter $D_{21}$ (refer to FIG. 6A) of the second particle 32 before compression is smaller than the diameter $D_{11}$ (refer to FIG. 6A) of the first particle 31 before compression, so that the second particle 32 is less compressed than the first particle 31 (in the embodiment, hardly compressed). The diameters $D_{21}$ and $D_{22}$ (refer to FIGS. 6A and 6B) of the second particle 32 before and after compression is, for example, 1.5 μm or more and 24 μm or less. The diameters $D_{21}$ and $D_{22}$ of the second particle 32 before and after compression are not limited to the range described above, but may be in a range in which the distance between the first base body 10 and the second base body 20 can be set in a target range.

In addition, the deformation rate (compression rate) $D_2$ of the second particle 32 defined in the formula 3 below and the aspect ratio $L_2$ of the second particle 32 defined in the formula 4 below are smaller than the deformation rate (compression rate) $D_1$ of the first particle 31 (refer to above formula 1) and the aspect ratio $L_1$ of the first particle 31 (refer to above formula 2). The deformation rate (compression rate) $D_2$ of the second particle 32 is, for example, 0 or more and 0.01 or less, and the aspect ratio $L_2$ of the second particle 32 is, for example, 1 or more and 1.01 or less.

$$D_2=(D_{21}-D_{22})/D_{21} \quad \text{[Formula 3]}$$

$D_2$: deformation rate (compression rate) of the second particle 32

$D_{21}$: diameter of the second particle in the AB direction before compression $D_{22}$: diameter of the second particle in the AB direction after compression $$L_2=L_{21}/L_{22} \quad \text{[Formula 4]}$$

$L_{21}$=length in the long axis direction (length in the EF direction in FIG. 6B)

$L_{22}$=length in the short axis direction (length in the AB direction in FIG. 6B)

The adhesive material 33 is for bonding the first base body 10 and the second base body 20. As the adhesive material 33, a thermosetting resin such as an epoxy resin and an ultraviolet curable resin such as an acrylic resin may be used. Especially, as the adhesive material 33, the thermosetting resin is preferred to be used from the viewpoint of operational efficiency of the manufacturing process.

In the touch panel X, the conductive adhesive member 30 is configured to include the two types of particles including the first particle 31 and the second particle 32, but is not limited to the above, and may be configured to include, for example, only the first particle 31. By employing such a configuration, one type of particle only has to be prepared, so that the configuration is preferable for cost reduction.

The opening portion M in the present embodiment is sealed by a sealing member 34, and the internal space S1 is a sealed space. Therefore, in the touch panel X, a possibility that water, a foreign object, and the like enters the internal space S1 through the opening portion M can be reduced. The plan view width W1 of the opening portion M in the present embodiment is smaller than the plan view width W2 of the external conductive area 20a. When the plan view width W1 of the opening portion M is set smaller than the plan view width W2 of the external conductive area 20a, the sealing stability of the sealing member 34 which seals the opening portion M can be improved. Therefore, in the touch panel X, it is possible to suppress an occurrence of a trouble caused by a foreign object or the like present between the first resistive film 12 of the first base body 10 and the second resistive film 22 of the second base body 20.

Examples of the sealing member 34 include insulating resins such as ultraviolet curable resin and thermosetting resin. Especially, the ultraviolet curable resin is preferred to be employed as the sealing member 34. When the sealing member 34 is formed by the ultraviolet curable resin, influences caused by heat can be reduced compared with the thermosetting resin, and further the operational efficiency improves.

In the touch panel X, the first base body 10 and the second base body 20 are bonded together by the conductive adhesive member 30 which electrically connects the first resistive film 12 and the wiring electrodes 23 and 24. Therefore, in the touch panel X, an area where the first resistive film 12 of the first base body 10 and the wiring electrodes 23 and 24 of the second base body 20 are electrically connected need not be separately secured inside the conductive adhesive member 30 (inside the internal space S1), so that downsizing can be accomplished.

The connection portions 23a to 26a of the wiring electrodes 23 to 26 of the touch panel X are located in an area 20b corresponding to the opening portion M. In other words, the connection portions 23a to 26a in the touch panel X are located in an area where the conductive adhesive member 30 is not present. Therefore, in the touch panel X, it is possible to prevent an occurrence of unnecessary electrical connection caused by the presence of the conductive adhesive member 30 even when, for example, patterning is not performed on the first resistive film 12 formed on the insulating substrate 11, so that the manufacturing efficiency can be improved. In addition, it is possible to prevent deterioration of yield rate caused by the patterning process because the patterning need not be performed on the first resistive film 12 in the touch panel X.

Next, an example of a bonding method in which the first base body 10 and the second base body 20 are bonded together by the conductive adhesive member 30 will be described.

As the conductive adhesive member 30, a member in which the first particles 31 and the second particles 32 are mixed into the adhesive material 33 in uncured state is used. In the description below, it is assumed that a thermosetting resin is employed as the adhesive material 33. As the first particle 31, a spherical insulating body such as a plastic ball on the surface of which a conductive material is coated, and the shape of which can be relatively easily deformed is employed. As the second particle, a particle such as silica sphere which is relatively difficult to deform is employed. In other words, when comparing the first particle 31 and the second particle 32, the second particle 32 has a larger compressive elasticity modulus than the first particle 31. As the first particle 31, for example, a particle having a compressive elasticity modulus of 300 kgf/mm² (about $2.9 \times 10^3$ MPa) or more and 600 kgf/mm² (about $5.9 \times 10^4$ MPa) or less is employed. As the second particle 32, for example, a particle having a compressive elasticity modulus of 1500 kgf/mm² (about $1.5 \times 10^4$ MPa) or more and 25000 kgf/mm² (about $2.5 \times 10^5$ MPa) or less is employed.

Here, the compressive elasticity modulus of the first particle 31 and the second particle 32 means so-called a 10% K value, and is defined by the formula 5 below.

$$10\% \, K \, \text{value} = (3/2^{1/2}) \cdot F \cdot S^{-3/2} \cdot R^{-1/2} \quad \text{[Formula 5]}$$

F: load value at 10% compressive deformation of a fine particle (Kgf)

S: amount of compressive deformation at 10% compressive deformation of the fine particle (mm)

R: radius of the fine particle (mm)

F, S, and R at the 10% K value can be obtained by compressing the fine particle corresponding to the first particle 31 and the second particle 32 by using a micro compression testing machine ("PCT-200" manufactured by Shimadzu Corporation) at room temperature. The compression of the fine particle corresponding to the first particle 31 and the second particle 32 is performed on a smooth end surface of a diamond cylinder with a diameter of 50 µm at a compression speed of 0.27 gf/second and a maximum testing load of 10 gf, for example.

When bonding the first base body 10 and the second base body 20, first, the conductive adhesive member 30 is printed (applied) on a predetermined area in the upper surface of the second base body 20 (the surface on which the wiring electrodes 23 and 24 are formed). In the present embodiment, the predetermined area is, as clearly illustrated in FIG. 1, an area surrounding the second resistive film 22 (area enclosed by two-dot chain lines).

Next, as illustrated in FIG. 6A, after positioning the first base body 10 to the second base body 20 on which the conductive adhesive member 30 is printed, the first base body 10 and the second base body 20 are bonded together via the conductive adhesive member 30, and a bonded structure is created.

Next, as illustrated in FIG. 6B, the first base body 10 and the second base body 20 of the created bonded structure are pressed in a direction in which both approach each other. Pressing in the present embodiment is performed until the second particle 32 contacts both the first base body 10 and the second base body 20 while deforming the first particle 31 by the first base body 10 and the second base body 20 so that the deformation rate (compression rate) $D_1$ (refer to formula 1) of the first particle 31 or the aspect ratio $L_1$ (refer to formula 2) of the first particle 31 increases.

Next, while maintaining the pressing state, the conductive adhesive member 30 is heated up to a curing temperature of adhesive material 33 to cure the adhesive material 33. In this way, the adhesive material 33 is cured and the first base body 10 and the second base body 20 are bonded together.

Next, an example of the touch panel type display apparatus according to the present invention will be described with reference to FIGS. 7 to 9.

Figure 7:
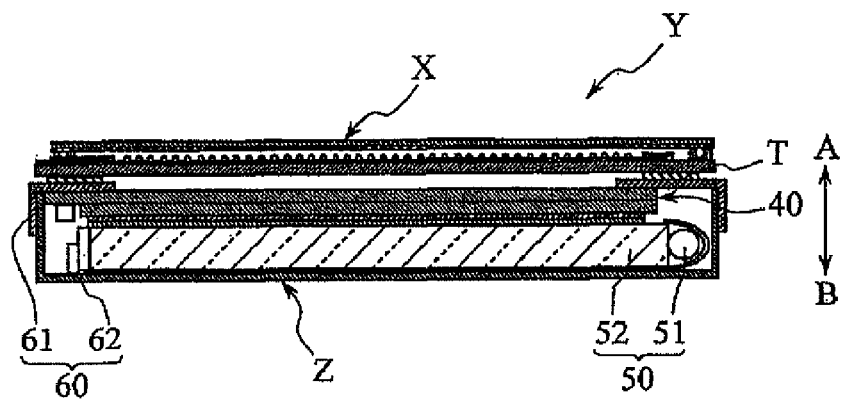
FIG. 7 is a cross-sectional view representing a schematic configuration of a touch panel type display apparatus including the touch panel illustrated in FIG. 1.
Figure 8:
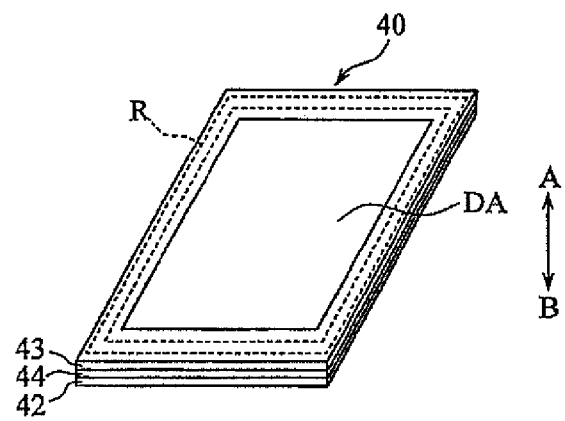
FIG. 8 is a perspective view representing a schematic configuration of a liquid crystal display panel of a liquid crystal display apparatus in the touch panel type display apparatus illustrated in FIG. 7.
Figure 9:
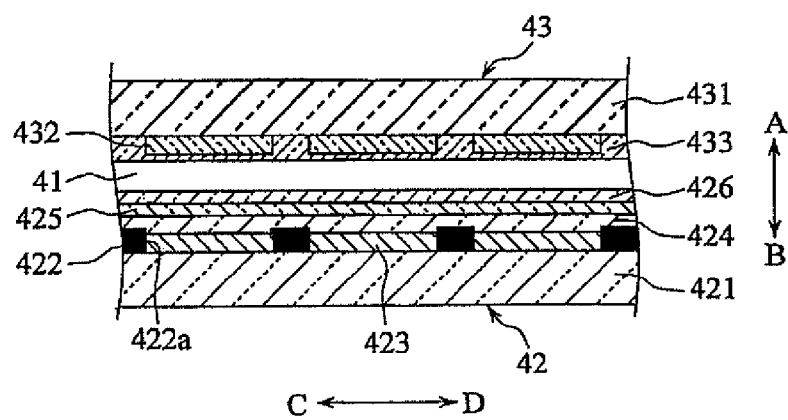
FIG. 9 is an enlarged cross-sectional view of an important portion of the liquid display panel illustrated in FIG. 7.

As illustrated in FIGS. 7 to 9, the touch panel type display apparatus Y according to the present embodiment includes the touch panel X and a liquid crystal display apparatus Z. The touch panel X is the touch panel having been described with reference to FIGS. 1 to 6.

The liquid crystal display apparatus Z includes a liquid crystal display panel 40, a backlight 50, and a housing 60.

The liquid crystal display panel 40 includes a liquid crystal layer 41, a first base body 42, a second base body 43, and a sealing member 44. The liquid crystal display panel 40 includes a display area DA which includes a plurality of pixels for displaying an image. The display area DA is constituted by arranging the liquid crystal layer 41 between the first base body 42 and the second base body 43, and sealing the liquid crystal layer 41 by the sealing member 44.

The liquid crystal layer 41 is a layer including a liquid crystal which shows electrical, optical, mechanical, and magnetic anisotropy, and combines regularity of solid and liquidity of liquid. Such liquid crystals include, e.g., a nematic liquid crystal, a cholesteric liquid crystal and a smectic liquid crystal. Spacers (not shown in the figures) constituted by, for example, a large number of particle members may be interposed in the liquid crystal layer 41 to maintain a constant thickness of the liquid crystal layer 41.

The first base body 42 includes a transparent substrate 421, a light shielding film 422, a color filter 423, a level film 424, a transparent electrode 425, and an oriented film 426.

The transparent substrate 421 is a member for contributing to support the light shielding film 422 and the color filter 423, and to seal the liquid crystal layer 41. The transparent substrate 421 is configured to be able to appropriately pass light in a direction (for example, AB direction) crossing the main surface of the transparent substrate 421. Examples of a constituent material of the transparent substrate 421 include glass and translucent plastic.

The light shielding film 422 has a role for shielding light (reducing an amount of passing light to smaller than a predetermined value), and is formed on the transparent substrate 421. The light shielding film 422 includes a through-hole 422a passing through in the film thickness direction (AB direction) for letting the light pass. Examples of a constituent material of the light shielding film 422 include resins (for example, acrylic resin) to which a dye or a pigment having a color (for example, black) with a high light shielding effect and carbon are added, and Cr.

The color filter 423 has a role for selectively absorbing a predetermined wavelength of the light entered in the color filter 423, and selectively passing only a predetermined wavelength of the light. Examples of the color filter 423 include a red color filter (R) for selectively passing a light of a wavelength of red visible light, a green color filter (G) for selectively passing a light of a wavelength of green visible light, a blue color filter (B) for selectively passing a light of a wavelength of blue visible light, and the like. The color filter 423 is constituted by, for example, adding a dye or a pigment to an acrylic resin.

The level film 424 has a role for leveling unevenness generated by arranging the color filter 423 or the like. Examples of a constituent material of the level film 424 include transparent resins such as an acrylic resin.

The transparent electrode 425 has a role for applying a predetermined voltage to a liquid crystal of the liquid crystal layer 41 located between the transparent electrode 425 and a transparent electrode 432 of the second base body 43 describe below, and has a translucency in a direction crossing the main surface of the transparent electrode 425 (for example, AB direction). The transparent electrode 425 has a role for transmitting a predetermined signal (image signal), and a plurality of transparent electrodes 425 are disposed to extend mainly in the direction of the arrow CD. Examples of a constituent material of the transparent electrode 425 include translucent conductive member such as ITO and tin oxide is used.

The oriented film 426 has a role for aligning liquid crystal molecules in the liquid crystal layer 41 which is oriented macroscopically at a random orientation (having a small regularity) in a predetermined orientation, and is formed on the transparent electrode 425. Examples of a constituent material of the oriented film 426 include polyimide resins and the like.

The second base body 43 includes a transparent substrate 431, the transparent electrode 432, and an oriented film 433.

The transparent substrate 431 is a member for contributing to support the transparent electrode 432 and the oriented film 433, and to seal the liquid crystal layer 41. The transparent substrate 431 is configured to be able to appropriately pass light in a direction (AB direction) crossing the main surface of the transparent substrate 431. Examples of a constituent material of the transparent substrate 431 include similar constituent materials to those of the transparent substrate 431.

The transparent electrode 432 has a role for applying a predetermined voltage to the liquid crystal of the liquid crystal layer 41 located between the transparent electrode 432 and the transparent electrode 425 of the first base body 42, and is configured to transmit light incident from one side to the other side. The transparent electrode 432 has a role for transmitting a signal (scanning signal) to the liquid crystal layer 41 for controlling a voltage application state (ON) or a voltage non-application state (OFF), and a plurality of the transparent electrodes 432 are disposed to extend mainly in a direction perpendicular to the page surface of FIG. 7 (for example, the EF direction in FIG. 1). Examples of a constituent material of the transparent electrode 432 include similar constituent materials to those of the transparent electrode 425.

The oriented film 433 has a role for aligning liquid crystal molecules in the liquid crystal layer 41 which is oriented macroscopically at a random orientation (having a small regularity) in a predetermined orientation, and is formed on the transparent electrode 432. Examples of a constituent material of the oriented film 433 include similar constituent materials to those of the oriented film 426.

The sealing member 44 has a role for sealing the liquid crystal layer 41 between the first base body 42 and the second base body 43, and bonding together the first base body 42 and the second base body 43 while the first base body 42 and the second base body 43 are separated by a predetermined distance. Examples of the sealing member 44 include insulating resins and sealing resins.

The backlight 50 has a role for emitting light from one side of the liquid crystal display panel 40 to the other side, and the backlight 50 employs an edge light method. The backlight 50 includes a light source 51 and a light guide plate 52. The light source 51 has a role for emitting light to the light guide plate 52, and is disposed at a side of the light guide plate 52. As the light source 51, for example, a CFL (Cathode Fluorescent Lamp), an LED (Light Emitting Diode), a halogen lamp, a xenon lamp, or an EL (Electro-Luminescence) may be used. The light guide plate 52 has a role for approximately uniformly guiding the light from the light source 51 to the entire area of the lower surface of the liquid crystal display panel 40. The light guide plate 52 generally includes a reflection sheet, a diffusion sheet, and a prism sheet. The reflection sheet (not shown in the figures) has a role for reflecting light, and is disposed on a back surface. The diffusion sheet (not shown in the figures) has a role for diffusing light to make surface luminescence more uniform, and is disposed on a front surface. The prism sheet (not shown in the figures) has a role for converging light in an approximately constant direction, and is disposed on the front surface. Examples of a constituent material of the light guide plate 52 include transparent resins such as an acrylic resin and a polycarbonate resin. The backlight 50 is not limited to a backlight of the edge light method in which the light source 51 is disposed at a side of the light guide plate 52, but another type of a backlight, such as a direct under type in which the light source 51 is disposed on the back side of the liquid crystal display panel 40 may be employed.

The housing 60 has a role for accommodating the liquid crystal display panel 40 and the backlight 50, and is configured to include an upper housing 61 and a lower housing 62. Examples of a constituent material of the housing 60 include resins such as a polycarbonate resin, metals such as aluminum, and alloys such as stainless steel (SUS).

Next, an example of a fixing method in which the touch panel X and the liquid crystal display apparatus Z are fixed together by a double-sided tape T will be described. A fixing member used in the fixing method of the touch panel X and the liquid crystal display apparatus Z is not limited to the double-sided tape T, but, for example, an adhesive member such as an ultraviolet curable resin or a thermosetting resin may be employed, or a fixing structure body for physically fixing together the touch panel X and the liquid crystal display apparatus Z may be employed.

First, one side of the double-sided tape T is attached to a predetermined area on an upper surface of the upper housing 61 of the liquid crystal display apparatus Z. The predetermined area of the embodiment is, as clearly illustrated in FIG. 8, an area R surrounding the display area DA of the liquid crystal display apparatus Z.

Next, after positioning the touch panel X to the liquid crystal display apparatus Z to which the double-sided tape T is attached, the insulating substrate 21 of the touch panel X and the upper housing 61 of the liquid crystal display apparatus Z are bonded together via the double-sided tape T. In this way, the touch panel X and the liquid crystal display apparatus Z are fixed together.

Since the touch panel type display apparatus Y includes the touch panel X, the touch panel type display apparatus Y can obtain the same advantage as that of the touch panel X mentioned above. Specifically, in the touch panel type display apparatus Y, it is possible to suppress an unnecessary contact between the resistive films 12, 22 and the wiring electrodes 23 and 24 or the wiring electrodes 25 and 26 even when an external force (such as a pressing force for inputting data through the touch panel) is applied to the touch panel X. The touch panel type display apparatus Y according to the present embodiment can improve manufacturing efficiency thereof compared with a case in which the form of the first resistive film 12 is shaped by the patterning.

Although a specific embodiment of the present invention has been described, the present invention is not limited to this, and various modifications are possible without departing from the spirit of the invention.

In the touch panel X, a phase difference film may be further disposed on at least one of the first base body 10 and the second base body 20. The phase difference film is an optical compensation member for converting linearly-polarized light converted into elliptically-polarized state by birefringence (phase shift) of the liquid crystal or the like into substantially linearly-polarized state from the elliptically-polarized state. Examples of a constituent material of the phase difference film include, for example, polycarbonate (PC), polyvinyl alcohol (PVA), polyarylate (PA), polysulfone (Psu), and polyolefin (PO). Especially, as the constituent material of the phase difference film, the PC is preferred from the viewpoint of the compatibility with wavelength dispersion of the liquid crystal, and the PO which has a smaller photoelastic coefficient than the PC is preferred from the viewpoint of adaptability to a circularly polarizing plate. Such a configuration is preferred to improve a contrast ratio of a display image.

In the touch panel X, a polarizing film may be further disposed on at least one of the first base body 10 and the second base body 20. The polarizing film has a role for selectively passing light having a predetermined vibration direction. Examples of a constituent material of the polarizing film include iodine materials and the like. Such a configuration is preferred to perform a shutter function for light passing the polarizing film.

In the touch panel X, a film on which anti-glare processing or anti-reflection coating is performed may be further disposed on at least one of the first base body 10 and the second base body 20. Such a configuration can reduce reflection of external light.

The insulating substrates 11 and 21 may be replaced by any one of the phase difference film, the polarizing film, and the film on which anti-glare processing or anti-reflection coating is performed.

Figure 10:
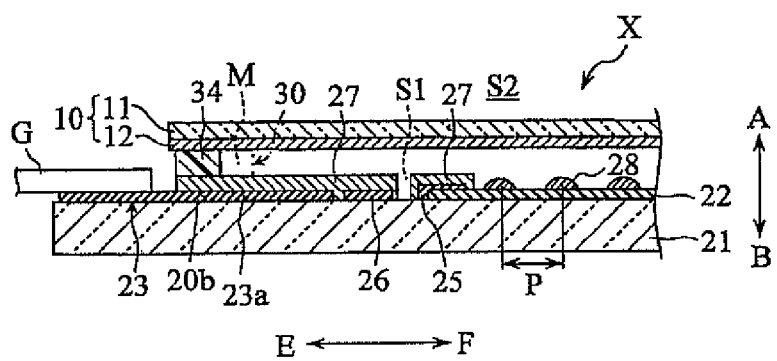
FIG. 10 is a cross-sectional view representing a first other example of the touch panel according to an embodiment of the present invention, the cross-sectional view corresponding to FIG. 4.

As illustrated in FIG. 10, the insulating layer 27 of the touch panel X may be formed so that the insulating layer 27 covers the entire area of the connection portions 23a to 26a of the wiring electrodes 23 to 26. In such a configuration, when the same material as that of the dot spacer 28 is employed as the insulating layer 27, the insulating layer 27 and the dot spacer 28 can be formed in the same process. Therefore, it is possible to maintain high manufacturing efficiency of the touch panel X. In addition, in the touch panel X, even when an external force is applied to the opening portion M, the insulation between the first resistive film 12 and the connection portions 23a to 26a can be more surely secured.

Figure 11:
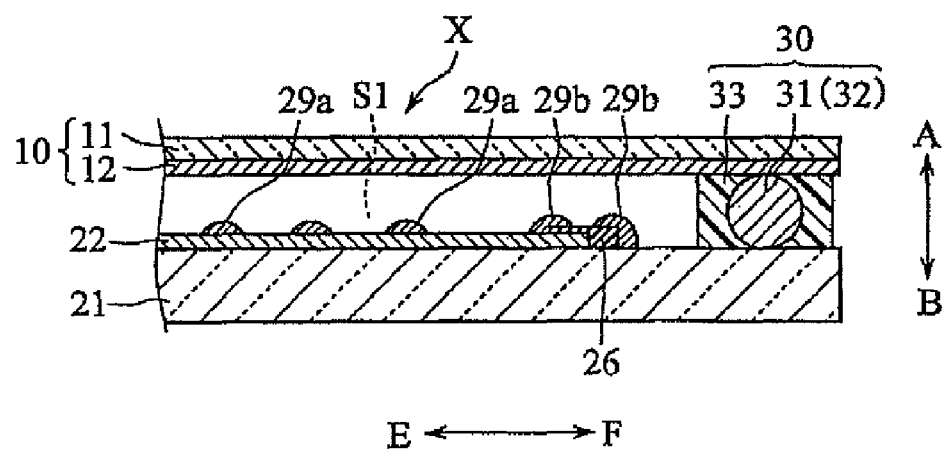
FIG. 11 is a cross-sectional view representing a second other example of the touch panel according to an embodiment of the present invention, the cross-sectional view corresponding to FIG. 2.
Figure 12:
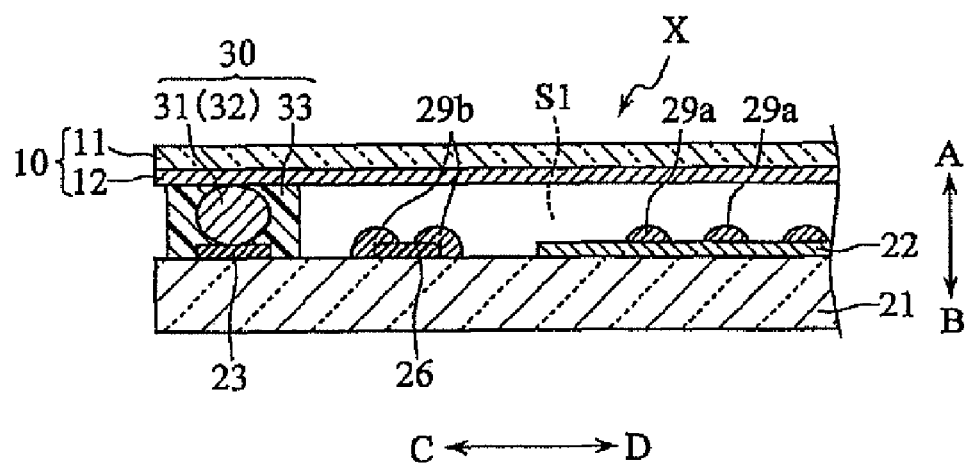
FIG. 12 is a cross-sectional view representing the second other example of the touch panel according to an embodiment of the present invention, the cross-sectional view corresponding to FIG. 3.
Figure 13:
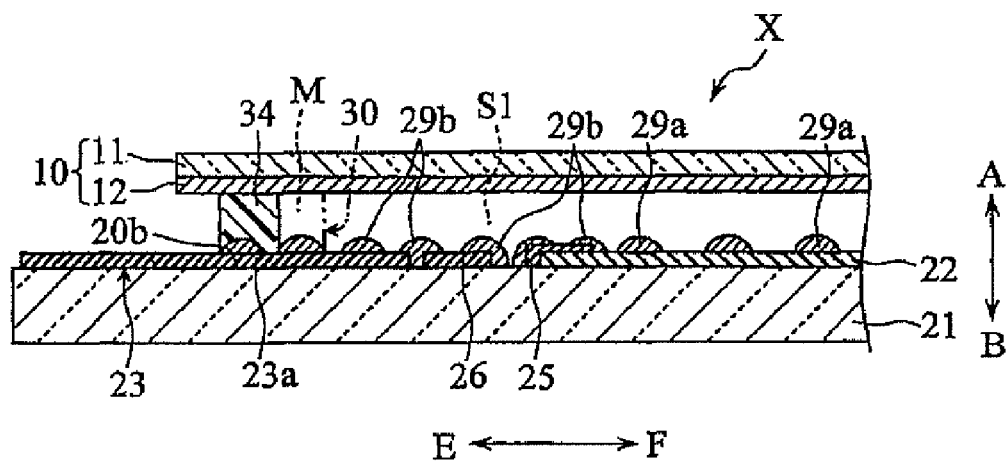
FIG. 13 is a cross-sectional view representing the second other example of the touch panel according to an embodiment of the present invention, the cross-sectional view corresponding to FIG. 4.

In the touch panel X, as illustrated in FIGS. 11 to 13, dot spacers 29a and 29b may be employed instead of the insulating layer 27 and the dot spacer 28.

When causing the first resistive film 12 and the second resistive film 22 to contact each other at a predetermined position (when inputting information), the dot spacer 29a has a role for preventing the first resistive film 12 and the second resistive film 22 from contacting each other in an area other than the predetermined position. The dot spacers 29a illustrated in FIGS. 11 to 13 are disposed in a matrix form (line-column form) at approximately regular intervals on the second resistive film 22. Preferably, the dot spacer 29a is difficult to see while fully performing a function for preventing improper contact between the first resistive film 12 and the second resistive film 22, and for example, the dot spacer 29a has a hemispherical shape with a diameter of 40 μm or less and a height of 1.0 μm or more and 3.5 μm or less. The distance between adjacent dot spacers 29a in the arrow CD direction or the arrow EF direction is, for example, 2 mm or more and 4 mm or less.

The dot spacer 29b has a role for preventing the first resistive film 12 and any of the wiring electrodes 23 to 26 from improperly contacting each other. The dot spacers 29b illustrated in FIGS. 11 to 13 are formed mainly in an area where the first resistive film 12 and the wiring electrodes 23 to 26 face each other. The dot spacer 29b has, for example, a hemispherical shape with a diameter of 40 μm or more and a height of 1.0 μm or more and 5.0 μm or less so that the dot spacer 29b fully performs a function for preventing improper contact between the first resistive film 12 and any of the wiring electrodes 23 to 26. The distance between adjacent dot spacers 29b in the arrow CD direction or the arrow EF direction is, for example, 0.3 mm or less.

In such a configuration, since the dot spacers 29b are formed on an area 20b corresponding to the opening portion M, the insulation between the first resistive film 12 and the wiring electrodes 23 to 26 can be sufficiently secured even when an external force is applied to the opening portion M.

Examples of a constituent material of the dot spacers 29a and 29b include ones similar to those of the dot spacer 28. In such a configuration, the dot spacer 29a and the dot spacer 29b can be formed in the same process, so that it is possible to maintain high manufacturing efficiency of the dot spacers 29a and 29b.

Figure 14:
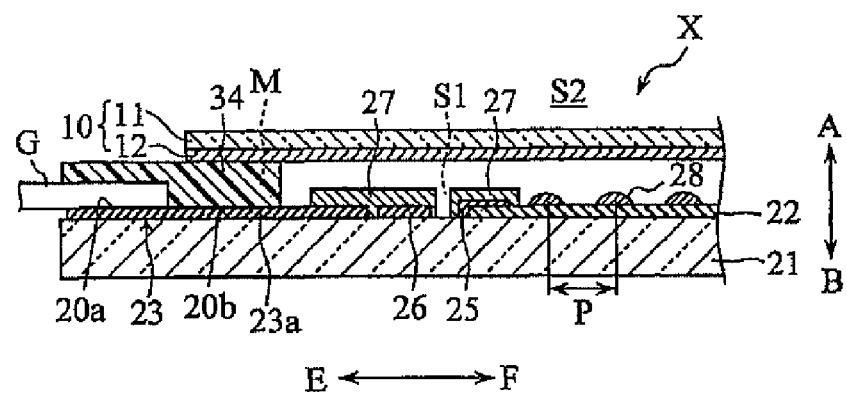
FIG. 14 is a cross-sectional view representing a third other example of the touch panel according to an embodiment of the present invention, the cross-sectional view corresponding to FIG. 4.

As illustrated in FIG. 14, the sealing member 34 of the touch panel X may cover at least a part of the conductive member G (a member for electrically connecting to an external circuit outside of FIG. 14). In such a configuration, the manufacturing efficiency can be more improved than when a material other than the sealing member 34 covers the conductive member G. In addition, in the touch panel X illustrated in FIG. 14, the distance between the external conductive area 20a (the conductive member G) and the opening portion M can be reduced, so that the touch panel X can be further downsized.

The sealing member 34 of the touch panel X may cover at least a part of a connection section between the wiring electrodes 23 to 26 and the conductive member G (for example, a part exposed from the side). In such a configuration, physical strength of the connection section can be increased, and further an amount of water or the like attached to the connection section can be reduced. Consequently it is possible to suppress the progress of corrosion or the like.

The invention claimed is:
1. A touch panel comprising:
a first base body including a first resistive film;
a second base body including a second resistive film and a wiring electrode; and
a conductive adhesive member configured to electrically connect the first resistive film and the wiring electrode, and bond the first base body and the second base body so that the first resistive film and the-second resistive film face each other and disposed to surround an area where the second resistive film is formed,
wherein the conductive adhesive member along with the first base body and the second base body defines an internal space and a single opening portion which connects the internal space and an external space,
the wiring electrode includes a connection portion connecting a portion of the wiring electrode located in the internal space and a portion of the wiring electrode located in the external space,
the connection portion is formed at a position corresponding to the opening portion, and
the opening portion is sealed by an insulating sealing member.
2. The touch panel according to claim 1, wherein the connection portion extends along a depth direction of the opening portion.
3. The touch panel according to claim 1, wherein the opening portion is formed in an area adjacent to an external conductive area for electrically connecting to an external circuit.
4. The touch panel according to claim 1, wherein the conductive adhesive member includes conductive particles.
5. The touch panel according to claim 1, wherein the insulating sealing member covers at least a part of a conductive member located in an external conductive area for electrically connecting to an external circuit.
6. The touch panel according to claim 5, wherein the insulating sealing member covers at least a part of a connection section between the wiring electrode and the conductive member.
7. The touch panel according to claim 5, wherein a plan view width of the opening portion is smaller than a plan view width of the external conductive area.
8. The touch panel according to claim 1, wherein the insulating sealing member is an ultraviolet curable resin.
9. The touch panel according to claim 1, further comprising a spacer located between the first resistive film and the second resistive film.
10. The touch panel according to claim 9, wherein the spacer is also located in an area corresponding to the opening portion.
11. The touch panel according to claim 9, further comprising an insulating layer which is constituted by the same material as that of the spacer and covers an entire area of the connection portion.
12. The touch panel according to claim 1, wherein the wiring electrode is made of a metal thin film.
13. The touch panel according to claim 12, wherein the metal thin film is an aluminum film, an aluminum alloy film, a laminated film of a chromium, film and an aluminum film, or a laminated film of a chromium film and an aluminum alloy film.
14. A touchpanel type display apparatus comprising:
a display panel; and
the touch panel according to claim 1 in which the first base body or the second base body is disposed to face the display panel.

* * * * *